United States Patent
Choi

(10) Patent No.: US 6,199,938 B1
(45) Date of Patent: Mar. 13, 2001

(54) SLIDING DOOR LOCKING DEVICE FOR VEHICLE

(75) Inventor: Jae-hong Choi, Namyangju (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/610,367

(22) Filed: Jul. 5, 2000

(30) Foreign Application Priority Data

Aug. 24, 1999 (KR) .................................................. 99-35113

(51) Int. Cl.$^7$ ................................ B62D 25/00; B60J 5/06
(52) U.S. Cl. ........................ 296/155; 296/155; 296/97.22; 292/DIG. 46
(58) Field of Search .................................. 296/155, 97.22; 292/DIG. 46; 180/286

(56) References Cited

U.S. PATENT DOCUMENTS

| | | | |
|---|---|---|---|
| 4,620,744 | * 11/1986 | Tui et al. ................................ | 296/155 |
| 5,454,618 | * 10/1995 | Sullivan .............................. | 296/97.22 |
| 5,520,431 | * 5/1996 | Kapes et al. ........................ | 296/97.22 |
| 5,538,312 | * 7/1996 | Lehmkuhl .......................... | 296/97.22 |
| 5,676,416 | * 10/1997 | Cooper .............................. | 296/97.22 |
| 5,769,481 | * 6/1998 | Cooper .............................. | 296/97.22 |
| 5,906,405 | * 5/1999 | Cooper .............................. | 296/97.22 |
| 6,007,141 | * 12/1999 | Thomas et al. ...................... | 296/155 |

* cited by examiner

Primary Examiner—Joseph D. Pape
(74) Attorney, Agent, or Firm—Finnegan, Henderson, Farabow, Garrett & Dunner, L.L.P.

(57) ABSTRACT

Disclosed is a sliding door locking device for a vehicle. The sliding door locking device for a vehicle comprises a striker secured to a sliding door to be integrally reciprocated along with the sliding door; a housing fastened to a body of the vehicle and having a slot into which the striker is inserted when the sliding door is closed; and a latch lock pivotally fixed to and inside the housing and having an engaging piece which is connected with a fuel filler lid through a cable, the latch lock being formed with a latch groove which functions to prevent the striker inserted into the slot of the housing from being moved out of the slot when the fuel filler lid is opened, thereby locking the striker inside the slot.

4 Claims, 6 Drawing Sheets

-PRIOR ART-

SLIDING DOOR LOCKING DEVICE FOR VEHICLE

BACKGROUND OF THE INVENTION

1. Field of the Invention

The present invention relates to a sliding door locking device for a vehicle such as a van, which locks a sliding door provided at a side of a body of the vehicle when a fuel filler lid is opened, and more particularly, the present invention relates to a sliding door locking device for a vehicle, in which a striker for locking and unlocking a sliding door and a latch lock are designed in a manner such that a mechanical interaction therebetween is optimized, thereby reducing manufacturing cost and rendering a simple structure of the entire sliding door locking device.

2. Description of the Related Art

Recently, as the leisure-seeking segment of the population has experienced growing numbers, a van type vehicle has made gains public favor. The van type vehicle adopts a sliding door at a side of its body, from the standpoint of passengers' convenience. The sliding door is provided at one side, that is, a left side or a right side of the body of the vehicle, and a fuel filler lid of the vehicle is arranged on the other side which is opposite to the one side having the sliding door.

In the meanwhile, these days, another van type vehicle which adopts a pair of sliding doors arranged at both sides, respectively of a body of the vehicle, in view of passengers convenience, is gaining in popularity. If the pair of sliding doors are arranged at both sides of the body as described above, as shown in FIG. 1, a fuel filler lid 1 is arranged along with the sliding door 12 at one side of the body.

However, in the vehicle in which the sliding door is arranged along with the fuel filler door at one side of the body of the vehicle, when the sliding door is opened, at the one side having the fuel filler lid within the limits of movement of the sliding door, while the fuel filler lid is opened and fuel is being filled into a fuel tank, there has a problem the sliding door can be collide with the fuel filler lid.

To cope with this problem, a sliding door locking device for a vehicle is disclosed in U.S. Pat. No. 4,620,744. The sliding door locking device serves to prevent a sliding door which is provided at the same side of a body of the vehicle, with a fuel filler lid, from being opened when the fuel filler lid is opened. In the sliding door locking device, as shown in FIGS. 2 and 3, an operating part 103 of an actuating lever 102 is located inward of a fuel filler lid 101 which is hingedly opened and closed. The actuating lever 102 is connected via a link member 104 having a rod-shaped configuration to a stopper lever 107 which acts on a stop member 106. Therefore, if the operating part 103 of the actuating lever 102 is pulled after the fuel filler lid 101 is opened, as the actuating lever 102 is hingedly rotated, the actuating lever 102 pulls the link member 104. According to this, the link member 104 rotates the stopper lever 107, and as a free end 107a of the stopper lever 107 is engaged with the stop member 106 of a sliding door 105, the sliding door 105 is prevented from being moved.

However, the sliding door locking device constructed as mentioned above still encounters a problem in that its operation involves annoying features. Also, in addition to the above described device, arrangements as stated in U.S. Pat. Nos. 5,520,431 and 5,676,416, yet still suffer from defects in that since they have complicated structures, they require a significant number of parts which increase both manufacturing cost and assembly time.

SUMMARY OF THE INVENTION

Accordingly, the present invention has been made in an effort to solve the problems occurring in the related art, and an object of the present invention is to provide a sliding door locking device for a vehicle, in which a striker for controlling opening and closing of a sliding door and a mechanism for limiting the movement of the striker are designed to render a simple stricture of the sliding door locking device, thereby reducing manufacturing cost.

In order to achieve the above object, according to the present invention, there is provided a sliding door locking device for a vehicle, comprising: a striker secured to a sliding door to be integrally reciprocated along with the sliding door; a housing fastened to a body of the vehicle and having a slot into which the striker is inserted when the sliding door is closed; and a latch lock pivotally fixed to and inside the housing and having an engaging piece which is connected with a fuel filler lid through a cable, the latch lock being formed with a latch groove which functions to prevent the striker inserted into the slot of the housing from being moved out of the slot when the fuel filler lid is opened, thereby locking the striker inside the slot.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
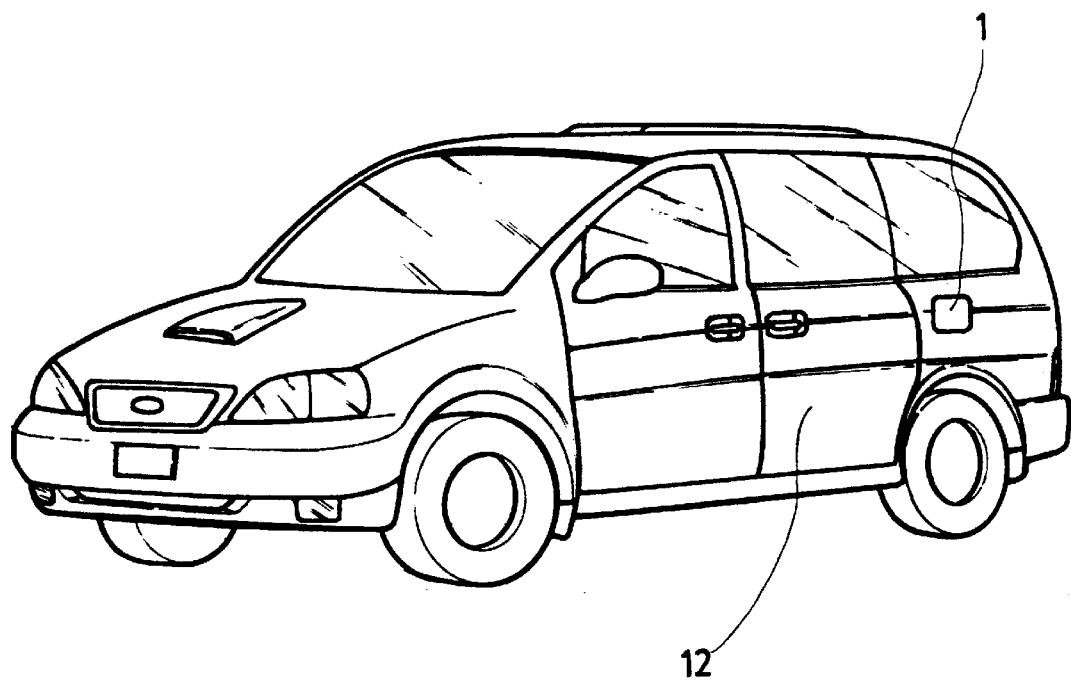
FIG. 1 is a perspective view illustrating a van type vehicle to which the present invention is applied.
Figure 2:
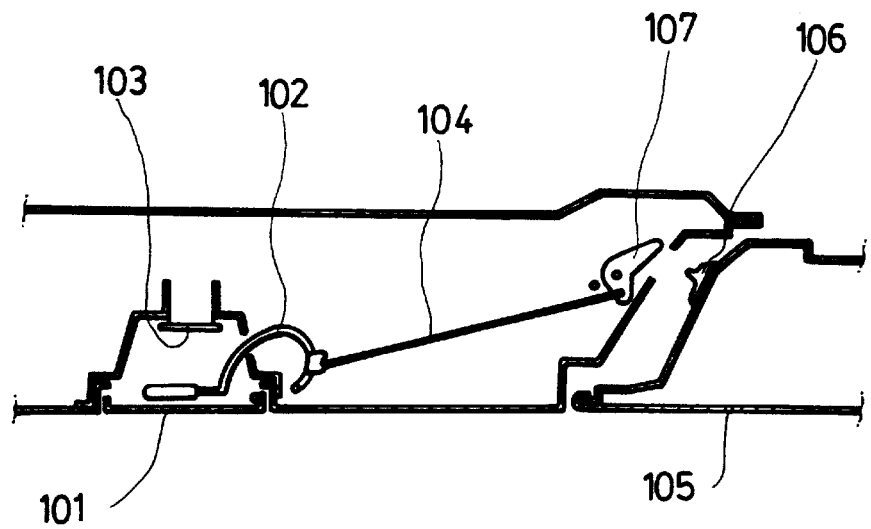
FIG. 2 is a cross-sectional view illustrating a state wherein a conventional sliding door locking device for a vehicle unlocks a sliding door.
Figure 3:
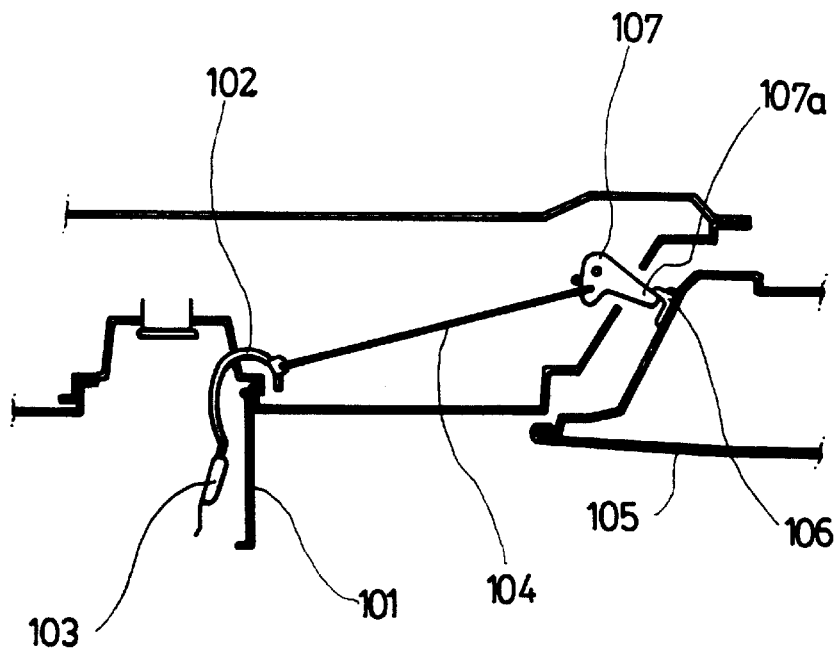
FIG. 3 is a cross-sectional view illustrating another state wherein the conventional sliding door locking device for a vehicle locks the sliding door.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
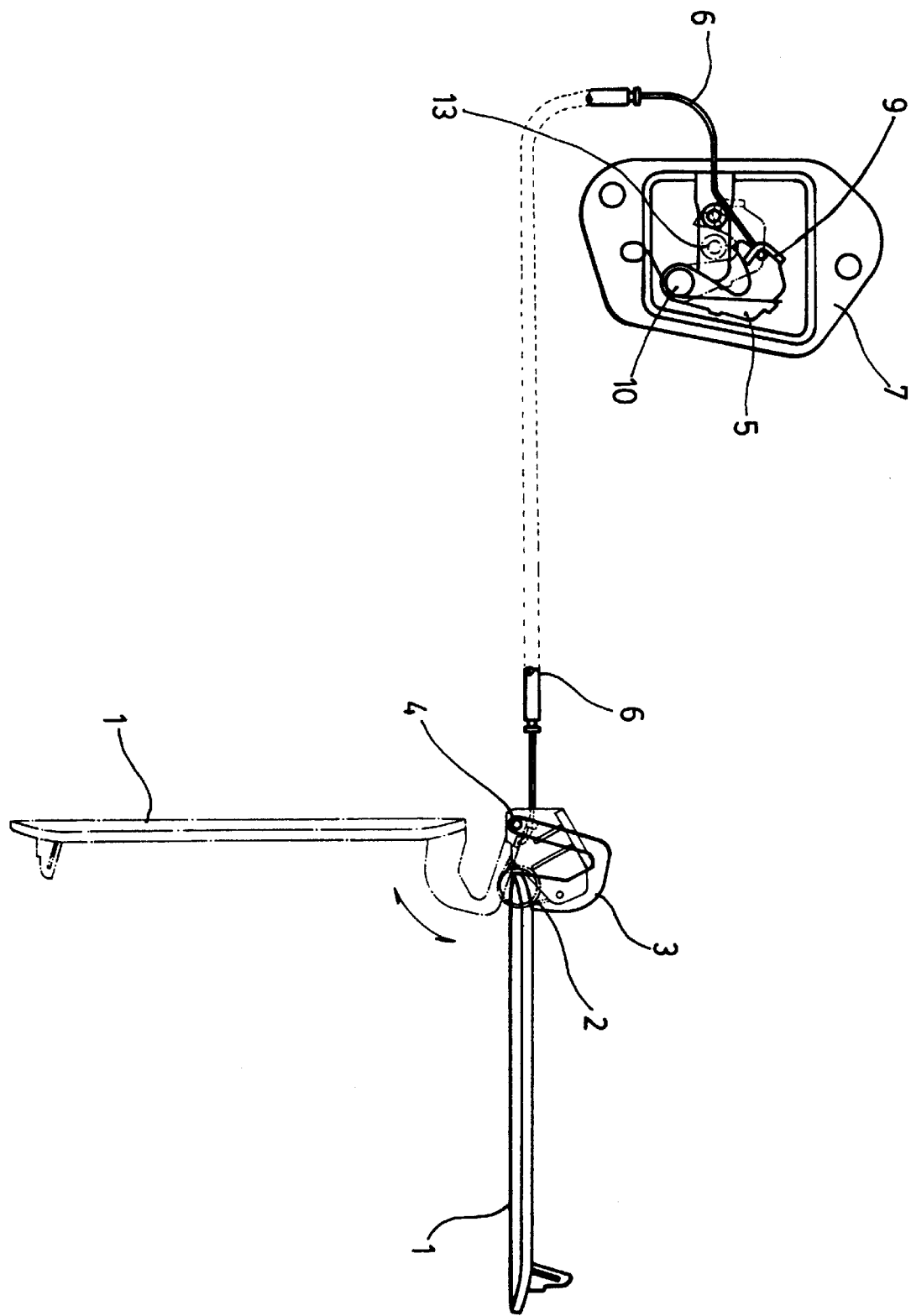
FIG. 4 is an exploded front view illustrating an entire structure of a sliding door locking device for a vehicle in accordance with an embodiment of the present invention.

FIG. 4 is an exploded front view illustrating an entire structure of a sliding door locking device for a vehicle in accordance with an embodiment of the present invention. As shown in FIG. 4, a fuel filler lid 1 is integrally connected with a hinge connection arm 3 which is elastically supported by a spring 2. A cable 6 for actuating a latch lock 5 is connected to a hinge shaft 4 of the hinge connection arm 3. The latch lock 5 is connected with the cable 6 via an engaging piece 9 by which a ball member 8 fastened to the cable 6 is supported. The latch lock 5 is received in a housing 7. The latch lock 5 is pivotally supported in the housing 7 by a latch rotation shaft 10 which is secured to the housing 7. Also, the latch lock 5 is elastically supported by a spring 11 which is wound around the latch rotation shaft 10.

On the other hand, the sliding door locking device for a vehicle in accordance with this embodiment of the present invention includes a striker 13, the housing 7 and the latch lock 5. The striker 13 is secured to a sliding door 12 to be integrally reciprocated along with the sliding door 12. The housing 7 is fastened to a body of the vehicle and has a slot 14 into which the striker 13 is inserted when the sliding door 12 is closed. The latch lock 5 is pivotally fixed to and inside the housing 7 and has the engaging piece 9 which is connected with the fuel filler lid 1 via the cable 6. The latch lock 5 is formed with a latch groove 15 which functions to prevent the striker 13 inserted into the slot 14 of the housing 7 from being moved out of the slot 14 when the fuel filler lid 1 is opened, thereby locking the striker 13 inside the slot 14.

Figure 6:
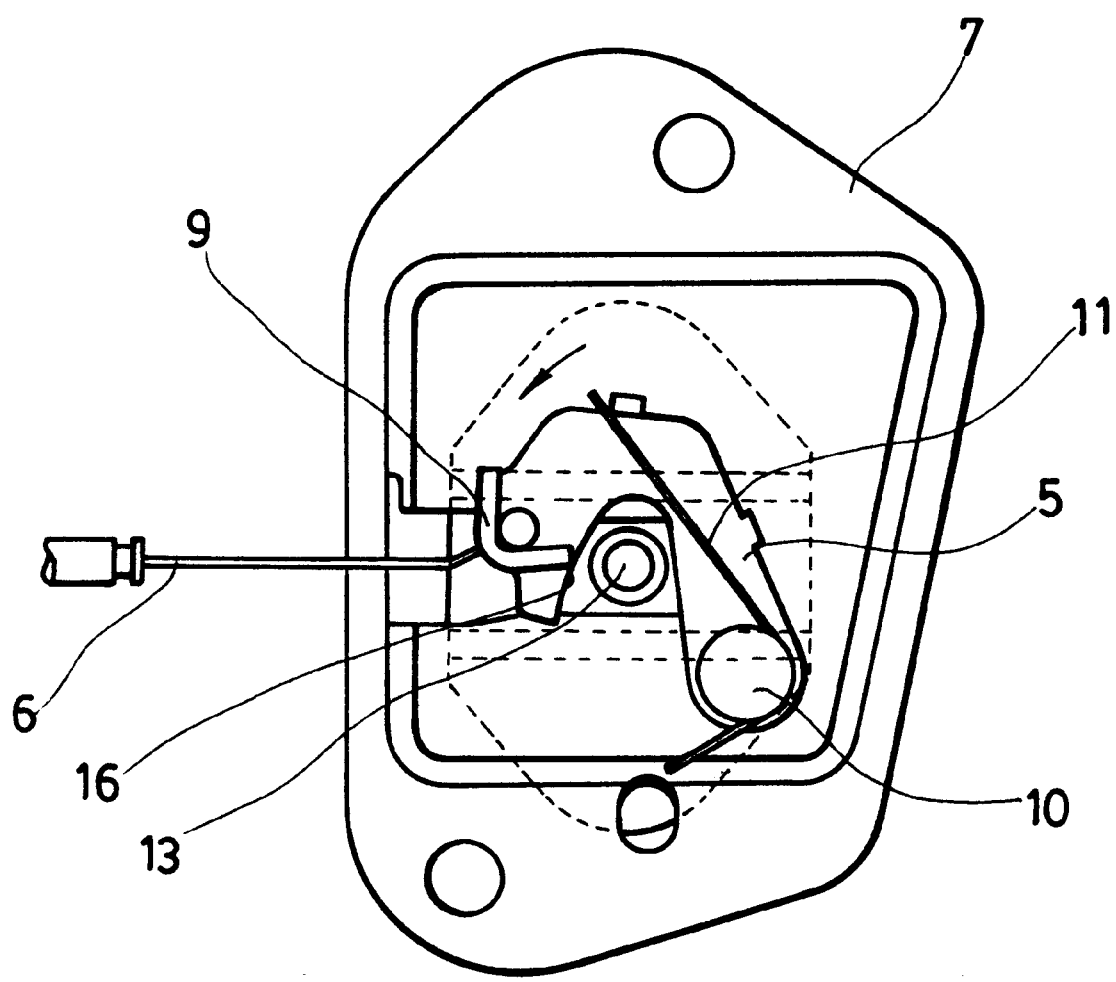
FIG. 6 is a cross-sectional view illustrating another state wherein the sliding door locking device for a vehicle according to the present invention locks the sliding door.

Here, the latch lock 5 is formed in a manner such that, when the striker 13 is locked inside the slot 14 as shown in FIG. 6, the latch rotation shaft 10 of the latch lock 5 is defined below a horizontal center line H of the striker 13 and a curved latch surface 16 defining the latch groove 15, with which the striker 13 is brought into contact, is defined above the horizontal center line H of the striker 13 while the curved latch surface 16 extends upward.

Figure 7:
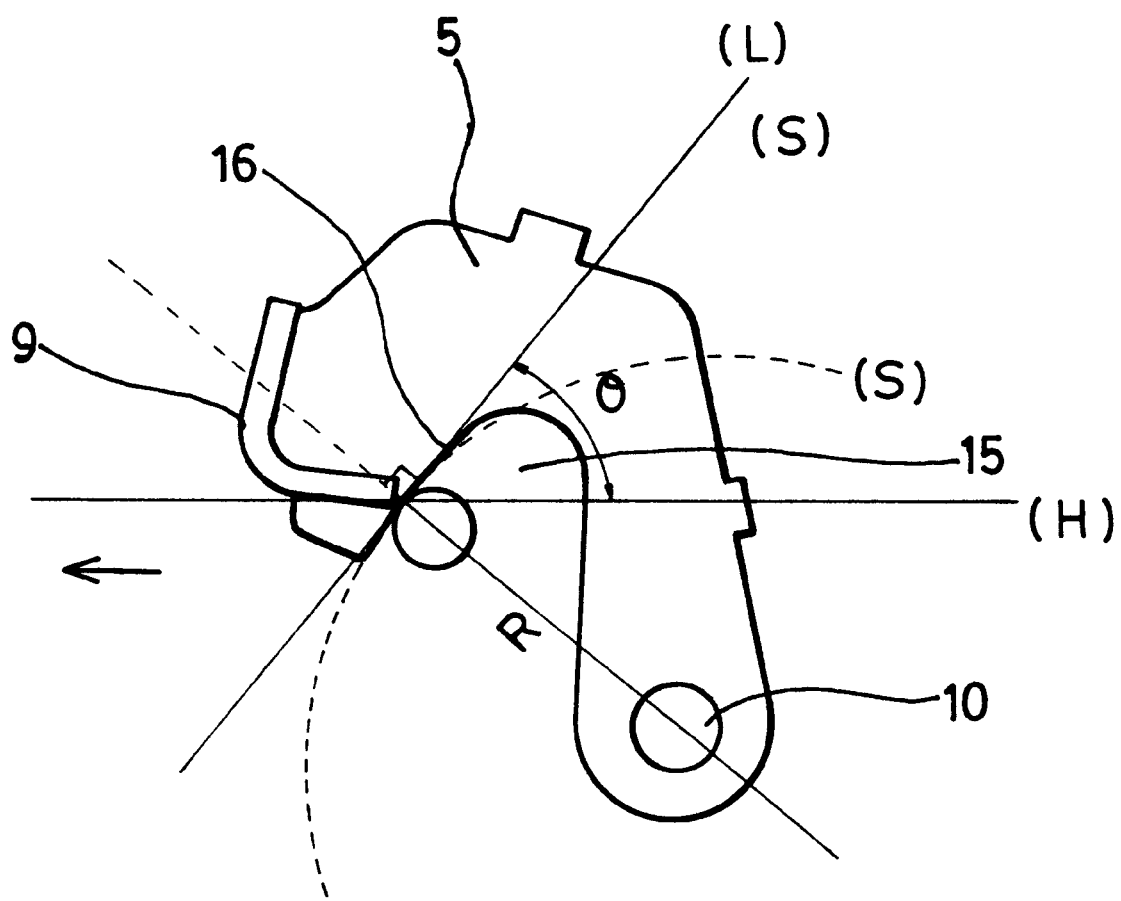
FIG. 7 is a schematic view for explaining a geometrical configuration of a latch lock which is incorporated into the sliding door locking device for a vehicle according to the present invention.

Also, as can be readily seen from FIG. 7, in a state wherein the striker 13 is locked inside the slot 14, that is, the fuel filler lid 1 is opened to lock the sliding door 12, the striker 13 is engaged with the latch surface 16 defining the latch groove 15, along a line of a virtual circular arc S which is formed by a radius R which extends from a center of the latch rotation shaft 10 to a point where the striker 13 and the latch surface 16 are brought into contact with each other.

On the other hand, while the striker 13 is locked inside the slot 14, an apex of a contact area between the striker 13 and the latch surface 16 is defined at a point where a tangent line L of the virtual circular arc S is crossed with the radius R which extends from the center of the latch rotation shaft 10 to the point where the striker 13 and the latch surface 16 are brought into contact with each other.

Figure 5:
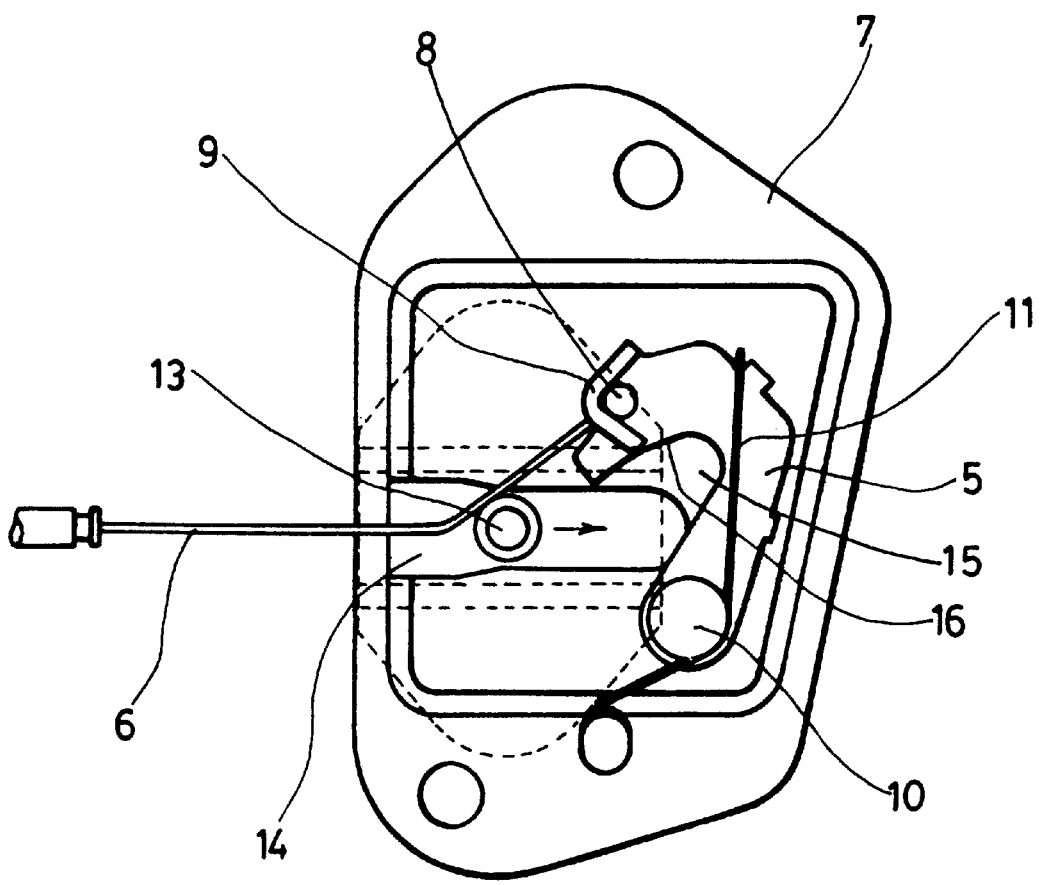
FIG. 5 is a cross-sectional view illustrating a state wherein the sliding door locking device for a vehicle according to the present invention unlocks a sliding door.

In a description of operations of the sliding door locking device for a vehicle according to the present invention, constructed as mentioned above, if the sliding door 12 is closed, the striker 13 is inserted into the slot 14, as shown in FIG. 5, which is defined in the housing 7, and after being moved inward along the slot 14, the striker 13 is maintained in a stopped state.

In a state wherein the sliding door 12 is closed, if the fuel filler lid 1 is opened as shown in FIG. 4, to allow fuel to be filled into a fuel tank, the cable 6 is pulled by a distance which is induced by the rotational displacement of the fuel filler lid 1, and force is transferred to the latch lock 5 through the engaging piece 9, whereby the latch lock 5 is rotated by a predetermined angle in a counterclockwise direction about the latch rotation shaft 10, as shown in FIG. 6. If the latch lock 5 is rotated as described above, as a portion of the latch lock 5 which defines the latch groove 15 surrounds the striker 13, the striker 13 is accommodated in the latch groove 15 and is prevented from moving leftward when viewed from a plane of FIG. 6, whereby the sliding door 12 to which the striker 13 is fastened cannot be opened.

If the fuel filler lid 1 is closed after filling fuel into the fuel tank, the pulled cable 6 is released, and according to this, the latch lock 5 is rotated by the predetermined angle in a clockwise direction about the latch rotation shaft 10 by the elastic force of the spring 11, whereby the latch lock 5 is returned to its original position as shown in FIG. 5. Consequently, as the striker 13 is unlocked from the latch groove 15, the sliding door 12 can be opened.

As described above, the sliding door locking device for a vehicle according to the present invention provides advantages in that, since a striker and a latch lock are designed in a manner such that a mechanical interaction therebetween is optimized, manufacturing cost is reduced and a simple structure of the entire sliding door locking device is accomplished.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A sliding door locking device for a vehicle, comprising:
   a striker secured to a sliding door to be integrally reciprocated along with the sliding door;
   a housing fastened to a body of the vehicle and having a slot into which the striker is inserted when the sliding door is closed; and
   a latch lock pivotally fixed to and inside the housing and having an engaging piece which is connected with a fuel filler lid through a cable, the latch lock being formed with a latch groove which functions to prevent the striker inserted into the slot of the housing from being moved out of the slot when the fuel filler lid is opened, thereby locking the striker inside the slot.

2. The sliding door locking device as claimed in claim 1, wherein the latch lock is formed in a manner such that, when the striker is locked inside the slot, a latch rotation shaft of the latch lock is positioned below a horizontal center line of the striker and a curved latch surface defining the latch groove, with which the striker is brought into contact, is defined above the horizontal center line of the striker while extending upward.

3. The sliding door locking device as claimed in claim 2, wherein, when the striker is locked inside the slot, the striker is engaged with the latch surface defining the latch groove, along a line of a virtual circular arc which is formed by a radius which extends from a center of the latch rotation shaft to a point where the striker and the latch surface are brought into contact with each other.

4. The sliding door locking device as claimed in claim 3, wherein, while the striker is locked inside the slot, an apex of a contact area between the striker and the latch surface is defined at a point where a tangent line of the virtual circular arc is crossed with the radius which extends from the center of the latch rotation shaft to the point where the striker and the latch surface are brought into contact with each other.

\* \* \* \* \*